US010744990B2

(12) United States Patent
Geue et al.

(10) Patent No.: US 10,744,990 B2
(45) Date of Patent: Aug. 18, 2020

(54) ARRANGEMENT OF AN ELECTRIC VACUUM PUMP IN A VEHICLE

(71) Applicant: HELLA GmbH & Co. KGaA, Lippstadt (DE)

(72) Inventors: Ingo Geue, Bad Sassendorf (DE); Theodor Hueser, Geseke (DE); Christian Praest, Langenberg (DE); Thomas Valeiras Fernandez, Lippstadt (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 225 days.

(21) Appl. No.: 15/988,309

(22) Filed: May 24, 2018

(65) Prior Publication Data

US 2018/0370517 A1 Dec. 27, 2018

Related U.S. Application Data

(63) Continuation of application No. PCT/EP2016/077556, filed on Nov. 14, 2016.

(30) Foreign Application Priority Data

Nov. 24, 2015 (DE) ........................ 10 2015 120 289

(51) Int. Cl.
*B60T 17/02* (2006.01)
*F04B 39/00* (2006.01)
(Continued)

(52) U.S. Cl.
CPC .............. *B60T 17/02* (2013.01); *B60T 13/46* (2013.01); *F01C 21/007* (2013.01);
(Continued)

(58) Field of Classification Search
CPC ........ B60T 17/02; B60T 13/46; F04C 18/344; F04C 25/02; F04C 2240/30; F04B 39/0044; F04B 53/003
See application file for complete search history.

(56) References Cited

U.S. PATENT DOCUMENTS 3,476,309 A 11/1969 Harlin
5,697,678 A * 12/1997 Huber ................... B60T 8/3685
303/116.4

(Continued)

FOREIGN PATENT DOCUMENTS

CN 101603536 A 12/2009
CN 102878080 A 1/2013
(Continued)

*Primary Examiner* — Charles G Freay
(74) *Attorney, Agent, or Firm* — Muncy, Geissler, Olds & Lowe, P.C.

(57) ABSTRACT

An arrangement of an electric vacuum pump, for example, in a vehicle, wherein a mounting element is provided on which the vacuum pump is installed, and wherein the vacuum pump comprises a pump chamber part and a motor part, and wherein a longitudinal axis extends through the pump chamber part and the motor part. According to the invention, the vacuum pump has a horizontal arrangement with respect to a gravitational direction, wherein the installation of the vacuum pump on the mounting element is limited to two mounting points, and wherein a center of gravity of the vacuum pump lies on a connection axis between the two mounting points.

6 Claims, 3 Drawing Sheets

(51) Int. Cl.
    *F04C 25/02* (2006.01)
    *F01C 21/00* (2006.01)
    *F04B 53/00* (2006.01)
    *F04C 18/344* (2006.01)
    *B60T 13/46* (2006.01)

(52) U.S. Cl.
    CPC ........ *F04B 39/0044* (2013.01); *F04B 53/003* (2013.01); *F04C 18/344* (2013.01); *F04C 25/02* (2013.01); *F04C 2240/30* (2013.01)

(56) References Cited

U.S. PATENT DOCUMENTS

| | | | |
|---|---|---|---|
| 6,336,794 B1 * | 1/2002 | Kim | F04B 39/0044 417/363 |
| 6,378,832 B1 * | 4/2002 | Li | F16F 1/3849 248/635 |
| 6,460,823 B1 | 10/2002 | Herder et al. | |
| 9,429,159 B2 | 8/2016 | Geue et al. | |
| 2008/0272646 A1 * | 11/2008 | Nakazawa | B60T 8/368 303/155 |
| 2010/0290896 A1 * | 11/2010 | Lenderink | F04D 17/122 415/169.2 |
| 2015/0078946 A1 * | 3/2015 | Geue | F04C 2/3442 418/150 |

FOREIGN PATENT DOCUMENTS

| | | |
|---|---|---|
| CN | 104228807 A | 12/2014 |
| DE | 1 918 116 A1 | 11/1969 |
| DE | 10 2012 112 069 A1 | 6/2014 |
| JP | 2013-155623 A | 8/2013 |
| KR | 10-2012-0119115 A | 10/2012 |
| KR | 10-2012-0119116 A | 10/2012 |

* cited by examiner

ARRANGEMENT OF AN ELECTRIC VACUUM PUMP IN A VEHICLE

This nonprovisional application is a continuation of International Application No. PCT/EP2016/077556, which was filed on Nov. 14, 2016, and which claims priority to German Patent Application No. DE 10 2015 120 289.1, which was filed in Germany on Nov. 24, 2015, and which are both herein incorporated by reference.

BACKGROUND OF THE INVENTION

Field of the Invention

The present invention relates to an arrangement of an electric vacuum pump, for example, in a vehicle, and to an electric vacuum pump of this kind, wherein a mounting element is provided on which the vacuum pump is installed, and wherein the vacuum pump comprises a pump chamber part and a motor part, and wherein a longitudinal axis extends through the pump chamber part and the motor part.

Description of the Background Art

DE 10 2012 112 069 A1, which corresponds to U.S. Pat. No. 9,429,159, which is incorporated herein by reference, discloses an electric vacuum pump for arrangement in a vehicle, and the vacuum pump has a pump chamber part and a motor part, and there is a flange part between the pump chamber part and the motor part. On the flange part, two diametrically opposed receiving formations for receiving rubber elements are formed, via which the vacuum pump can be arranged on a mounting element.

Vacuum pumps of this kind are used to feed gases or liquids in motor vehicles; these vacuum pumps are preferably used for engine management and for brake boosting in a vehicle. Depending on the design of the installation environment, such electric vacuum pumps must be arranged horizontally, for which at least a three-point support is necessary.

To this end, FIG. 1 shows an electric vacuum pump 1 in arrangement on a mounting element 10, and vacuum pump 1 has a pump chamber part 11 and a motor part 12, and a longitudinal axis 13 extends through parts 11 and 12. Electric vacuum pump 1 is arranged on mounting element 10 so that it is installed horizontally and so that longitudinal axis 13 extends substantially horizontally. In this case, a horizontal arrangement in the context of the invention relates to any arrangement that is not provided at least such that longitudinal axis 13 extends vertically. For example, longitudinal axis 13 can be perpendicular to gravitational direction G at an angle of +/−30 degrees in its arrangement on mounting element 10.

Between pump chamber part 11 and motor part 12, vacuum pump 1 has a flange part 17 on which two mounting points 14 are formed in the form of rubber elements 18.

Mounting element 10 is designed so that, moreover, a free end 12' of motor part 12 also forms a mounting point 14, and free end 12' is formed by a bearing section in which the motor shaft of motor part 12 is supported on a rear side. For this purpose, mounting element 10 has a receiving lug through which the bearing section extends.

The three-point support, known from the prior art, for the horizontal installation of electric vacuum pump 1 requires a complex and space-intensive design of mounting element 10. Ostensibly with limited spatial conditions in the installation environment of electric vacuum pump 1, in particular in the engine compartment of a vehicle, a considerable advantage would be achieved if mounting element 10 can be made simpler.

SUMMARY OF THE INVENTION

It is therefore an object of the present invention to provide the refinement of an installation of an electric vacuum pump and of a vacuum pump of this kind, which is simple in design and requires a smaller installation space. In particular, the object is to simplify the design of the mounting element on which the vacuum pump can be installed.

The invention includes the technical teaching that the vacuum pump has a horizontal arrangement with respect to a gravitational direction, wherein the installation of the vacuum pump on the mounting element is limited to two mounting points and wherein a center of gravity of the vacuum pump lies on a connection axis between the two mounting points.

The refinement of the vacuum pump according to the invention with the special design of the mounting points achieves that regardless of the installation position of the vacuum pump no gravity moments act on the mounting points. If the center of gravity is located on a connection axis between the two mounting points, in particular on the bisector of the connection axis, no moments act on the mounting points, because the gravitational direction spans a plane with the two mounting points. The essential forces that act on the vacuum pump, in particular the gravity of the vacuum pump due to the self-weight, act in the spanned plane, and no bending moments act on the mounting points. As a result of the refinement of the mounting points according to the invention, the vacuum pump can have a horizontal arrangement with respect to the gravitational direction, and the installation of the vacuum pump can be limited to two mounting points without the rear motor bearing also having to be received by the mounting element at the free end of the motor part. The result is a significant simplification of the mounting element in a very space-saving design. Moreover, the weight of the arrangement is reduced by downsizing the mounting element.

The mounting element advantageously has an opening through which the vacuum pump extends. The mounting points are arranged with further advantage on a first side of the mounting element, wherein the motor part extends with a free end through the opening to a second side of the mounting element, opposite the first side. The free end of the motor part describes a rear part of the motor part, which protrudes freely from the opening in the mounting element, without the end of the motor part being received by the provided mounting element or by another mounting means.

According to an advantageous refinement, the vacuum pump has a flange part, which is formed between the pump chamber part and the motor part and on which the mounting points are arranged. The installation of the vacuum pump occurs, for example, via rubber elements in which the mounting points are formed. With further advantage, receiving formations that are designed, for example, pocket-like are formed on the flange part. The rubber elements are received in the pocket-like receiving formations, wherein the receiving formations extend towards the free end of the motor part. The adaptation of the mounting points to the structurally predetermined center of gravity of the vacuum pump is achieved by bringing the receiving formations out of the plane of the flange part towards the free end of the motor part. The receiving formations are formed so far towards the free end of the motor part by means of an offset that the center of gravity of the vacuum pump is guided into the connection axis between the two mounting points. Due to the design, the center of gravity is located approximately in the upper third of the motor part, which is directed towards the flange part. The flange part is formed, for example, by an aluminum die-cast part, and the receiving formations form pocket-like recesses in which the rubber elements can sit. The pocket-like recesses have, for example, bottom sections which are formed offset so far towards the free end of the motor part that the center of gravity of the vacuum pump coincides with a plane jointly defined by the bottom sections of the receiving formations.

The rubber elements can be advantageously held in a positive manner in the receiving formations, and the rubber elements are arranged with further advantage on the mounting element by means of screw elements. Recesses may be formed in the receiving formations, and the rubber elements may be made slotted so that the rubber elements may be pressed into the recesses. Finally, the screw elements can be passed through the rubber elements to produce a loss-proof placement of the vacuum pump on the mounting element. After the screw elements are passed through the rubber elements, they can no longer slip out of the recesses of the receiving formations and a form-locking connection forms between the rubber elements and the receiving formation.

The invention is directed further to an electric vacuum pump for the horizontal arrangement on a mounting element in a vehicle, comprising a pump chamber part and a motor part, wherein a flange part, on which two diametrically opposed receiving formations for receiving the rubber elements are formed, is placed between the pump chamber part and the motor part. According to the invention, the receiving formations are formed offset towards a free end of the motor part. Thus, the advantage is achieved that a center of gravity of the electric vacuum pump is located on a connection axis between the two receiving formations on the flange part, so that the installation of the electric vacuum pump can be limited to two receiving formations and the thus formed mounting points.

The receiving formations are advantageously arranged laterally to the substantially cylindrical motor part. With further advantage, the receiving formations have a bottom section with a recess into which the rubber elements can be inserted, wherein a center of gravity of the vacuum pump lies in a plane defined by the bottom sections.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
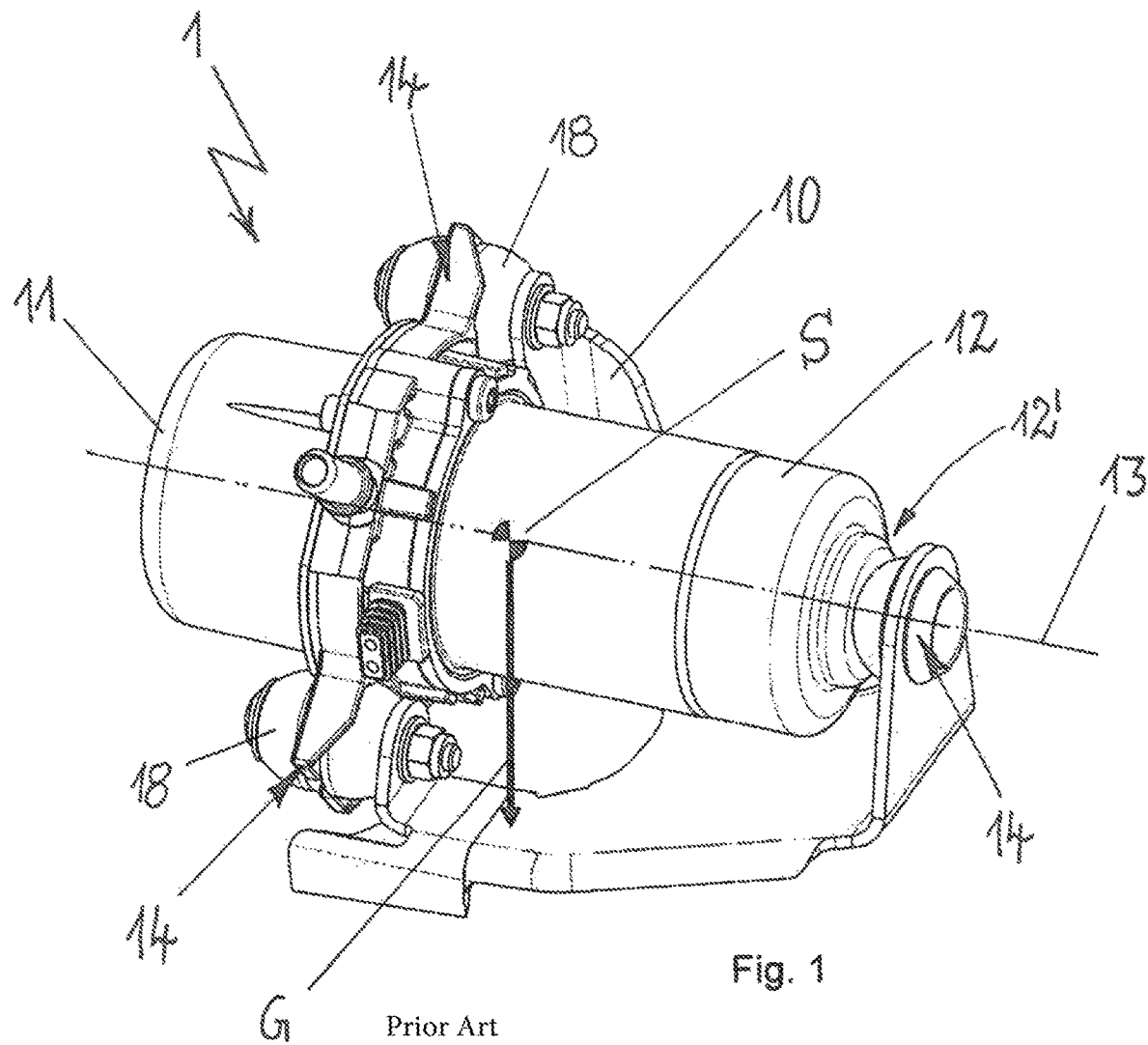
FIG. 1 is a perspective view of an electric vacuum pump in an arrangement on a mounting element according to the prior art.

FIG. 1 shows an electric vacuum pump 1 in an arrangement on a mounting element 10 according to the prior art, wherein the shown arrangement has already been described in connection with the introductory part of the present description.

Figure 2:
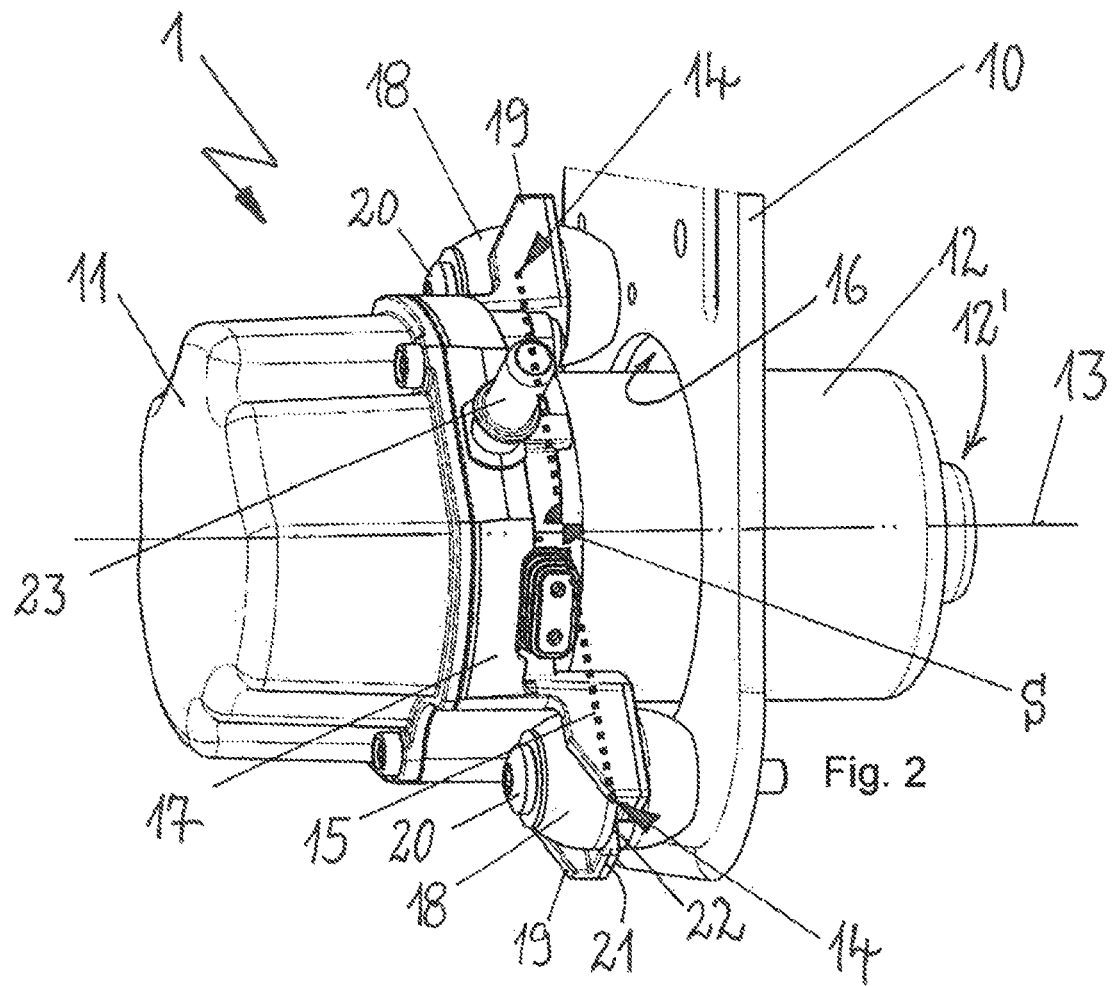
FIG. 2 is a perspective view of an electric vacuum pump in an arrangement on a mounting element, wherein the installation of the vacuum pump is limited to two mounting points.
Figure 3:
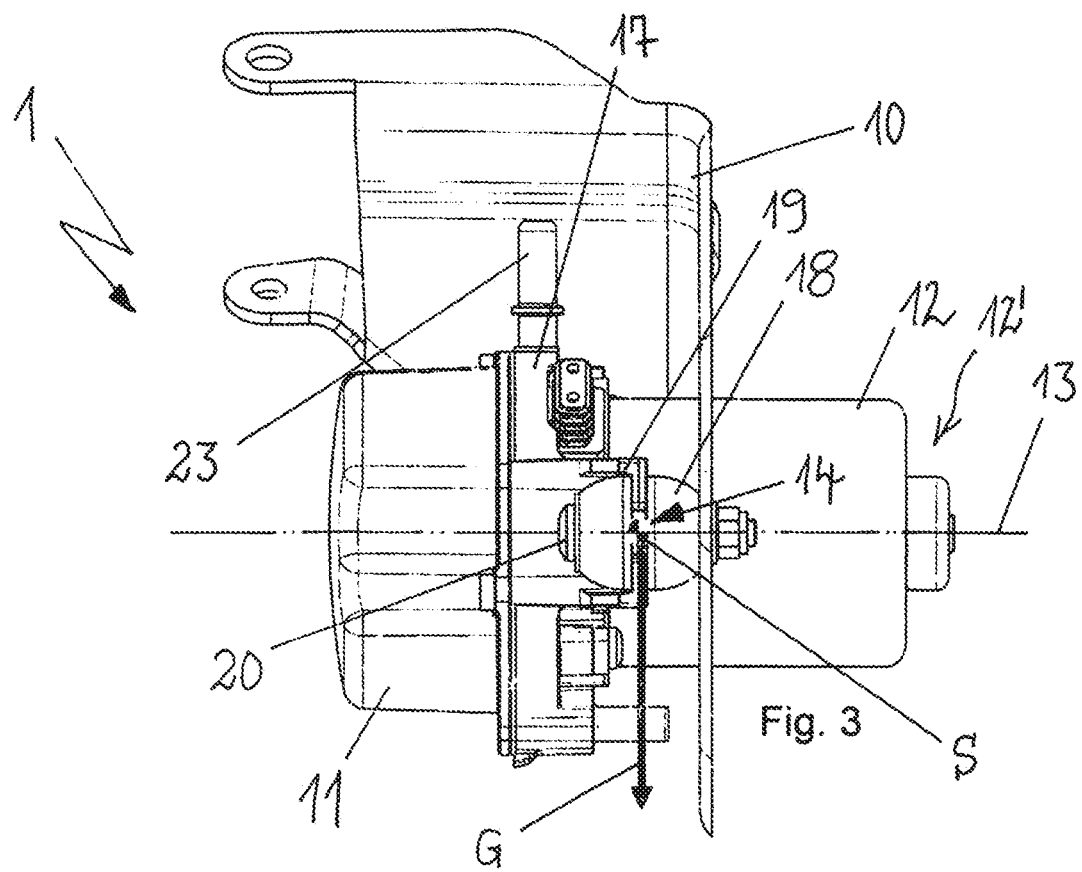
FIG. 3 is a further view of the electric vacuum pump in an arrangement on the mounting element according to the present invention.

FIGS. 2 and 3 show an electric vacuum pump 1 in two different perspective views in an arrangement on a mounting element 10 for installing vacuum pump 1, for example, in a vehicle, in particular in the engine compartment of a vehicle.

Electric vacuum pump 1 has a pump chamber part 11 and a motor part 12, and a flange part 17 is located between pump chamber part 11 and motor part 12. Motor part 12 is used to drive a vane cell pump, which is formed in pump chamber part 11, so that a vacuum can be generated with vacuum pump 1, for example, via an inlet port 23.

Mounting element 10 has an opening 16 through which motor part 12 extends, and motor part 12 terminates in a free end 12', which is not received via any further mount.

The installation of vacuum pump 1 on mounting element 10 is thus limited to two mounting points 14. These are formed by receiving formations 19 on flange part 17, and rubber elements 18, which are fastened by screw elements 20 on mounting element 10, sit in receiving formations 19. Rubber elements 18 are inserted into recesses 22 which are formed in bottom section 21 of receiving formations 19. A connection axis 15, on which center of gravity S of electric vacuum pump 1 is located, extends between the two defined mounting points 14.

If, as shown in FIG. 3, the gravitational force acts at the center of gravity S in the gravitational direction G, no bending moments arise in mounting points 14, in particular formed by inertial forces of vacuum pump 1. The specific arrangement of receiving formations 19 in a manner in which the center of gravity S of vacuum pump 1 lies between the two receiving formations 19, in a horizontal position as well, balances electric vacuum pump 1 such that no vibration forces, bending moments, tilting, and the like result at mounting points 14 under dynamic loads of the arrangement.

Receiving formations 19 are integrally formed with flange part 17 and receiving formations 19 are offset towards free end 12' of motor part 12. A coincidence of the center of gravity S with connection axis 15 results only due to this offset, and center of gravity S lies with particular advantage in the bisector between the two mounting points 14 on connection axis 15.

The perspective views show that the pocket-like receiving formations 19 are pulled out of the plane of flange part 17 and extend towards motor part 12. Consequently, receiving formations 19 are located laterally next to the pump-side end region of motor part 12 in which the overall center of gravity S of the electric vacuum pump is located. The entire vacuum pump 1 has consequently been brought out of opening 16 of mounting element 10 towards pump chamber part 11 until the coincidence of connection axis 15 with center of gravity S has been reached.

As a result, mounting element 10 is simply designed and extends in only one plane around opening 16, and a section of mounting element 10 does not need to be produced that receives free end 12' of motor part 12. This results in significant improvements in the space requirement of the arrangement and mounting element 10 can be made simpler and lighter.

The invention is not limited in its execution to the preferred exemplary embodiment described above. Rather, a number of variants are conceivable which make use of the illustrated solution in fundamentally different embodiments as well. All features and/or advantages emerging from the claims, the description, or the drawings, including structural details, spatial arrangements, and process steps, can be essential to the invention both alone and in the most diverse combinations.

The invention being thus described, it will be obvious that the same may be varied in many ways. Such variations are not to be regarded as a departure from the spirit and scope of the invention, and all such modifications as would be obvious.

What is claimed is:

1. An electric vacuum pump mounting system in a vehicle, comprising:
   an electric vacuum pump having a pump chamber part, a motor part, two rubber elements, and a flange part placed between the pump chamber part and the motor part, and
   a mounting element on which the electric vacuum pump is installed,
   wherein a longitudinal axis of the electric vacuum pump extends through the pump chamber part and the motor part,
   wherein the longitudinal axis of the electric vacuum pump extends horizontally with respect to a gravitational direction,
   wherein the electric vacuum pump is connected to the mounting element at only two mounting points,
   wherein a center of gravity of the electric vacuum pump lies on a connection axis between the two mounting points,
   wherein the two mounting points are formed by the two rubber elements, the flange part having only two diametrically opposed receiving formations that retain the rubber elements,
   wherein the receiving formations protrude from the flange part in a direction towards a free end of the motor part, such that the receiving formations are offset towards the free end of the motor part,
   wherein each of the rubber elements have a central opening extending therethrough to receive a screw element, and
   wherein the receiving formations are oriented such that an axis of the central opening of each of the rubber elements retained in the receiving formations is parallel to the longitudinal axis of the electric vacuum pump.

2. The mounting system according to claim 1, wherein the mounting element has an opening through which the motor part of the electric vacuum pump extends.

3. The mounting system according to claim 2, wherein the mounting points are arranged on a first side of the mounting element and wherein the motor part extends through the opening to a second side of the mounting element, opposite the first side.

4. An electric vacuum pump horizontally arranged on a mounting element in a vehicle, the electric vacuum pump comprising:
   a pump chamber part;
   a motor part;
   two rubber elements; and
   a flange part placed between the pump chamber part and the motor part, on the flange part having only two diametrically opposed receiving formations that retain the rubber elements;
   wherein the receiving formations protrude from the flange part in a direction towards a free end of the motor part, such that the receiving formations are formed offset towards the free end of the motor part,
   wherein a longitudinal axis of the electric vacuum pump extends through the pump chamber part and the motor part,
   wherein each of the rubber elements have a central opening extending therethrough to receive a screw element, and
   wherein the receiving formations are oriented such that an axis of the central opening of each of the rubber elements retained in the receiving formations is parallel to the longitudinal axis of the electric vacuum pump.

5. The electric vacuum pump according to claim 4, wherein the receiving formations are arranged laterally to the motor part.

6. The electric vacuum pump according to claim 4, wherein the receiving formations have a bottom section with a recess into which the rubber elements are inserted, and wherein a center of gravity of the electric vacuum pump lies in a plane defined by the bottom sections.

* * * * *